May 14, 1946.   R. C. BLAYLOCK   2,400,385
POWER OPERATED GUN MOUNT
Filed Nov. 12, 1941   10 Sheets-Sheet 1

Fig. 1

INVENTOR
RAYMOND C. BLAYLOCK
BY
ATTORNEY

INVENTOR
RAYMOND C. BLAYLOCK
BY
ATTORNEY

May 14, 1946.    R. C. BLAYLOCK    2,400,385
POWER OPERATED GUN MOUNT
Filed Nov. 12, 1941    10 Sheets-Sheet 4

INVENTOR
RAYMOND C. BLAYLOCK
BY
ATTORNEY

May 14, 1946.  R. C. BLAYLOCK  2,400,385
POWER OPERATED GUN MOUNT
Filed Nov. 12, 1941  10 Sheets-Sheet 5

INVENTOR
RAYMOND C. BLAYLOCK
BY
ATTORNEY

INVENTOR
RAYMOND C. BLAYLOCK
BY
ATTORNEY

INVENTOR
RAYMOND C. BLAYLOCK
BY
ATTORNEY

Patented May 14, 1946

2,400,385

UNITED STATES PATENT OFFICE 2,400,385

POWER OPERATED GUN MOUNT

Raymond C. Blaylock, Bexley, Ohio, assignor to Curtiss-Wright Corporation, a corporation of Delaware Application November 12, 1941, Serial No. 418,686

2 Claims. (Cl. 89—37.5)

This invention relates to flexible mounts for automatic guns, particularly adapted for use in aircraft.

Objects of the invention are (a) to provide an aircraft gun mount assembly of relatively small dimensions wherein the gun is moved in traverse and in elevation by power means, (b) to provide a power operated gun mount whose control is extremely accurate and sensitive, (c) to provide a power operated gun mount wherein traverse and elevation of the gun is accomplished by manipulation of a single control member or handle at all times under the control of a gunner, (d) to provide a sighting system for a flexibly mounted gun wherein the sighting system is remote from the gun but movable therewith, (e) to provide a seat or other accomodation for a gunner which is adapted to move with the gun in traverse, and which is adapted to move with respect to the gun when the latter is moved in elevation, whereby a normally seated gunner may at all times sight the gun without reaching or stretching from his normal position towards the sight; an associated object is to provide a seat and sight system wherein the distance from the seat to the sight eyepiece is substantially constant regardless of the aiming position of the gun, (f) to provide limit stop means in a power operated gun mount to prevent aiming of the gun at structural parts of the aircraft or vehicle in which it is mounted, (g) to provide an ammunition feed system for a flexibly mounted automatic gun wherein belted ammunition may be fed to the gun from a fixed container, regardless of the angular position of the gun with respect to the container, (h) to provide retrieving means for components of spent ammunition, (i) to provide a completely hydraulic system for actuating a flexibly mounted gun in traverse and elevation, (j) to provide such accessories in the hydraulic system as will improve the functioning thereof to maintain the system in properly correlated relationship, (k) to provide a separable enclosure for a gunner's cockpit which may be quickly released in case of emergency, (l) to provide a hydraulic generator and motor system by which movement of the gunner's seat is coordinated with movement of the gun.

In general, the gun mount of this invention comprises a circular track mounted in an aircraft or other vehicle, with which a circular carriage is movably engaged. The carriage supports an automatic gun which is adjustable as to elevation with respect to the carriage. Further, a gunner's seat is mounted for vertical sliding on the carriage and means are provided to slide the seat vertically in response to changes in the angle of elevation of the gun. A remote optical sight is mounted upon the carriage and is movable with the gun in traverse and elevation, and the gunner's seat is so arranged as to move substantially uniformly with the eyepiece of the optical sight. Hydraulic motors are provided to afford traversing and elevating movements for the carriage and gun respectively and a single control handle is arranged to control the flow of pressure fluid to both of these motors whereby sensitive and rapid training of the gun may be affected by the manipulation of a single control member. The above brief summary recites the general structure and for a complete understanding of all of the details of the invention as well as for an appreciation of further objects thereof, reference may be made to the annexed drawings, in which:

General arrangement

Figure 7:
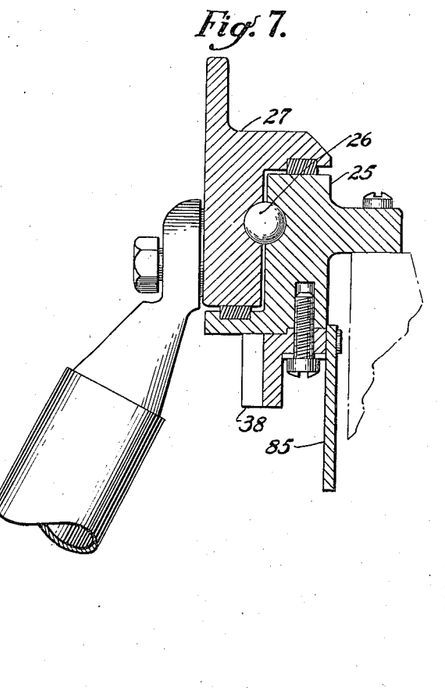
Fig. 7 is a section on the line 7—7 of Fig. 6.
Figure 16:
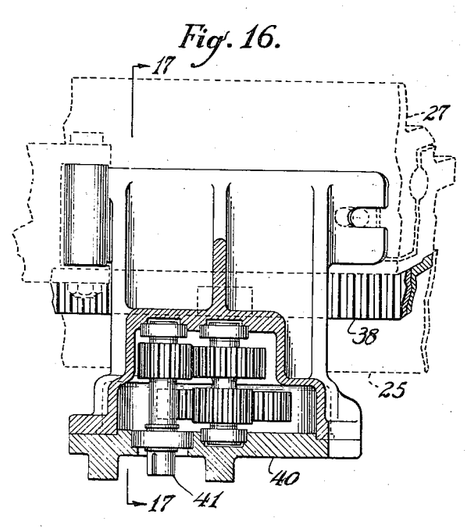
Fig. 16 is an elevation, partly in section, of the traversing reduction gear for the carriage.
Figure 17:
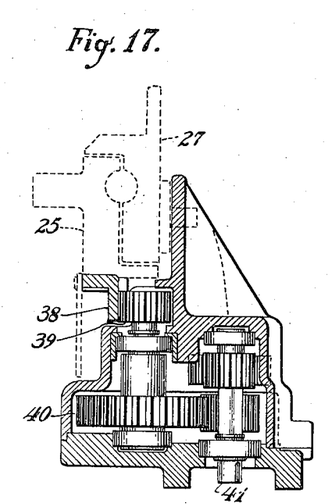
Fig. 17 is a section on the line 17—17 of Fig. 16.

The general organization of the gun mount system may be best appreciated by referring to Figs. 1, 3, 11, and 18. An annular track 25 provides the main structural mount for the assembly, this track being secured in an appropriate cockpit in an aircraft or other vehicle. Fitted to this track, and borne by ball bearings 26 (Fig. 7), is a carriage ring 27 to which the various devices of the gun mount are secured. An automatic gun or cannon 28 is supported at trunnions 29 on brackets 30 secured to the carriage 27, said trunnions including an elevating gear sector 31 meshed with a pinion 32 (Fig. 2), driven by a gear train 33 from a bevel pinion 34 comprising the output element of a speed reducer 35 driven by a hydraulic motor 36. The mounting ring 25 carries a circular rack or internal gear 38 with which the output pinion 39 of a speed reducer 40 (Figs. 16 and 17) is meshed, the input shaft 41 of said speed reducer being driven by a hydraulic motor 42. Control of the elevating motor 36 and of the traversing motor 42 is afforded by a unitary valve assembly 44 having a handle 45 extending from the top thereof. Movement of the handle in a radial direction with respect to the gun ring affords elevational adjustment for the gun while tangential movement of the handle 45, with respect to the gun ring, affords traversing control for the carriage. The detailed construction of the valve assembly 44 does not form a specific part of this invention but to those familiar with the art, it will be apparent that a two-way valve assembly of this character, controlled by a single handle, is known.

Figures 4, 5:
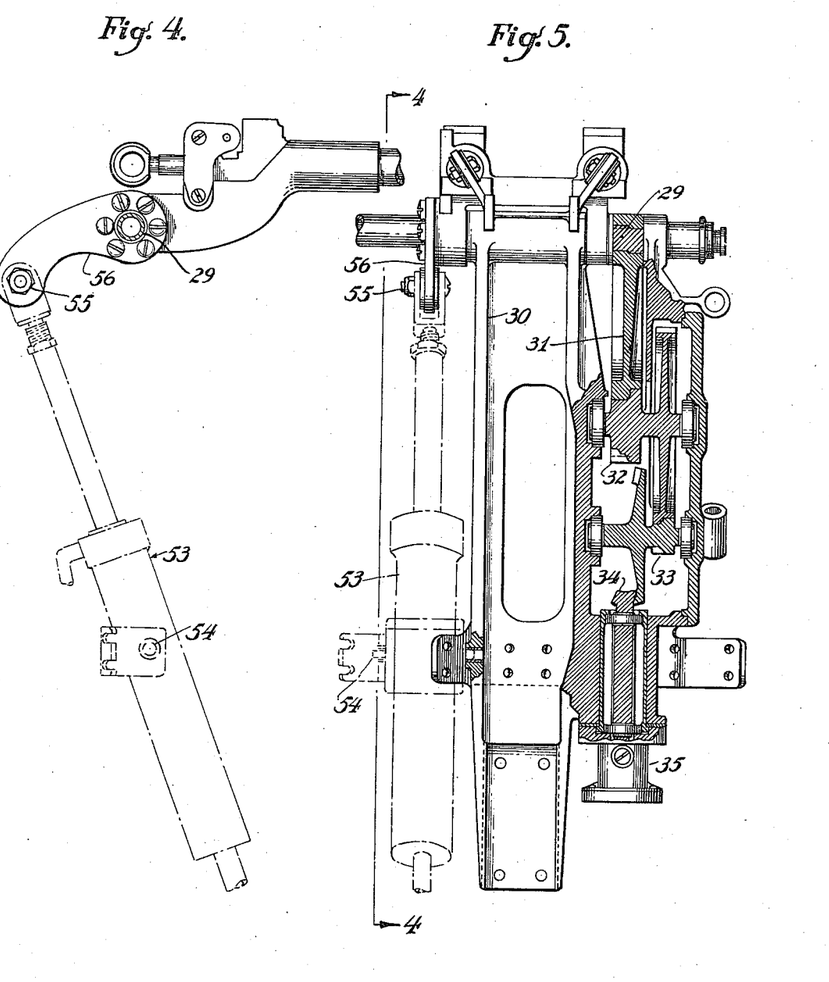
Fig. 4 is an enlarged view of a portion of the seat control generator comprising a partial view on the line 4—4 of Fig. 5.
Fig. 5 is a front elevation, partly in section, of the gun trunnion and elevating mechanism and of the seat control pump.
Figure 6:
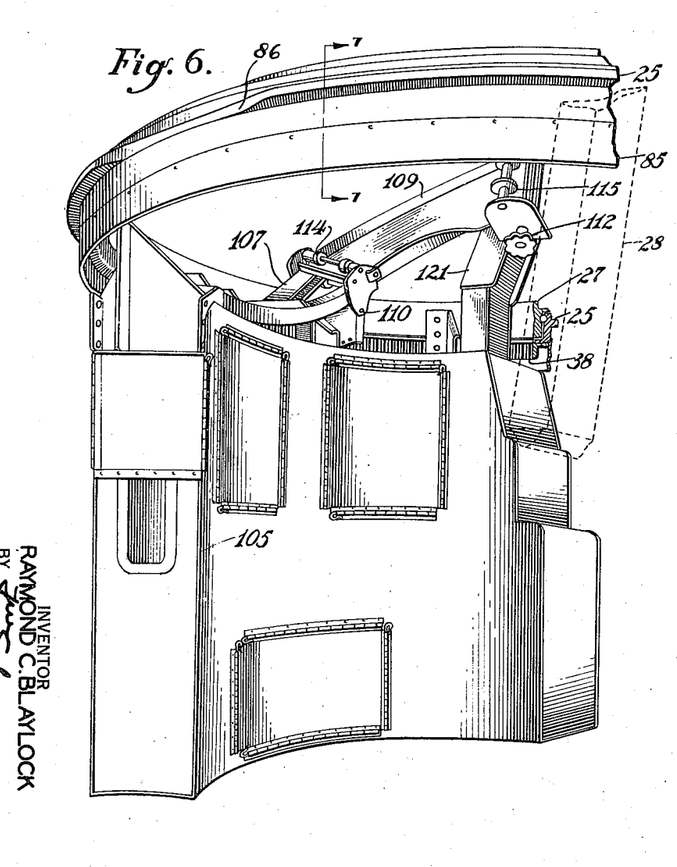
Fig. 6 is a fragmentary perspective view of a portion of the gun carriage, showing in particular, the unit container for belted ammunition and for components of spent ammunition.
Figure 18:
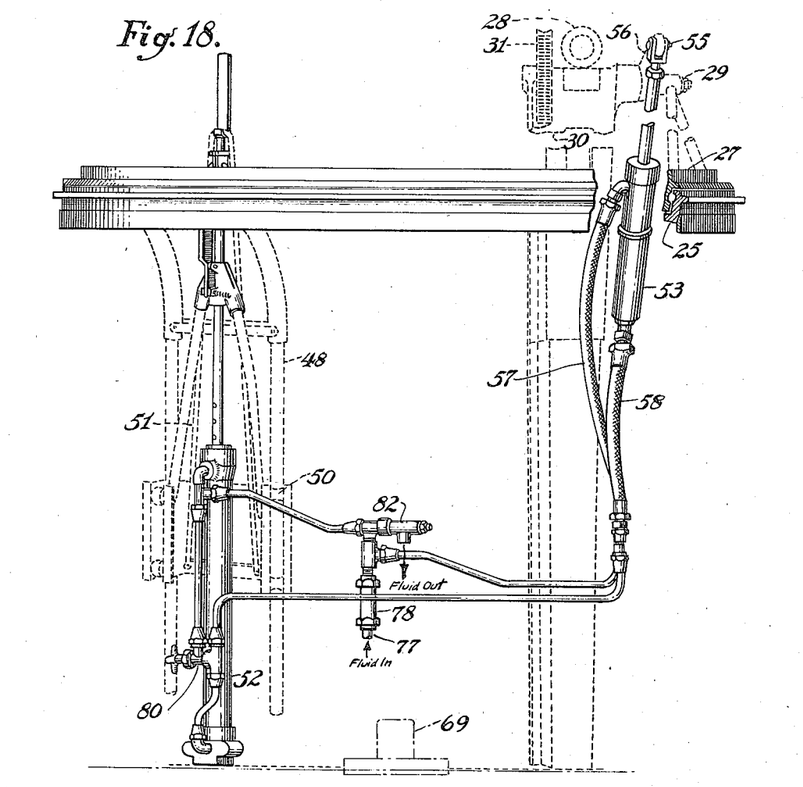
Fig. 18 is a fragmentary elevation of a portion of the gun mount showing the seat control system.
Figure 19:
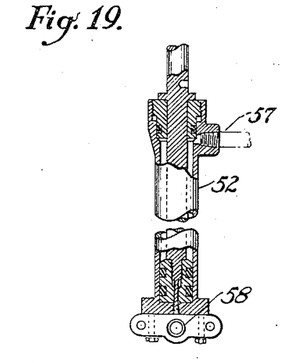
Fig. 19 is an elevation, partly in section, of the seat control motor as depicted in Fig. 18.
Figure 20:
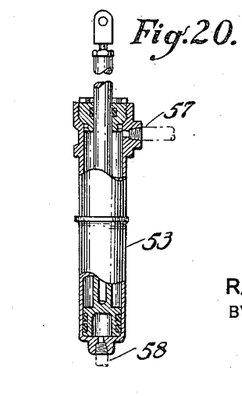
Fig. 20 is a fragmentary elevation, partly in section, of the seat control pump shown in its entirety in Fig. 18.
Figures 21, 22:
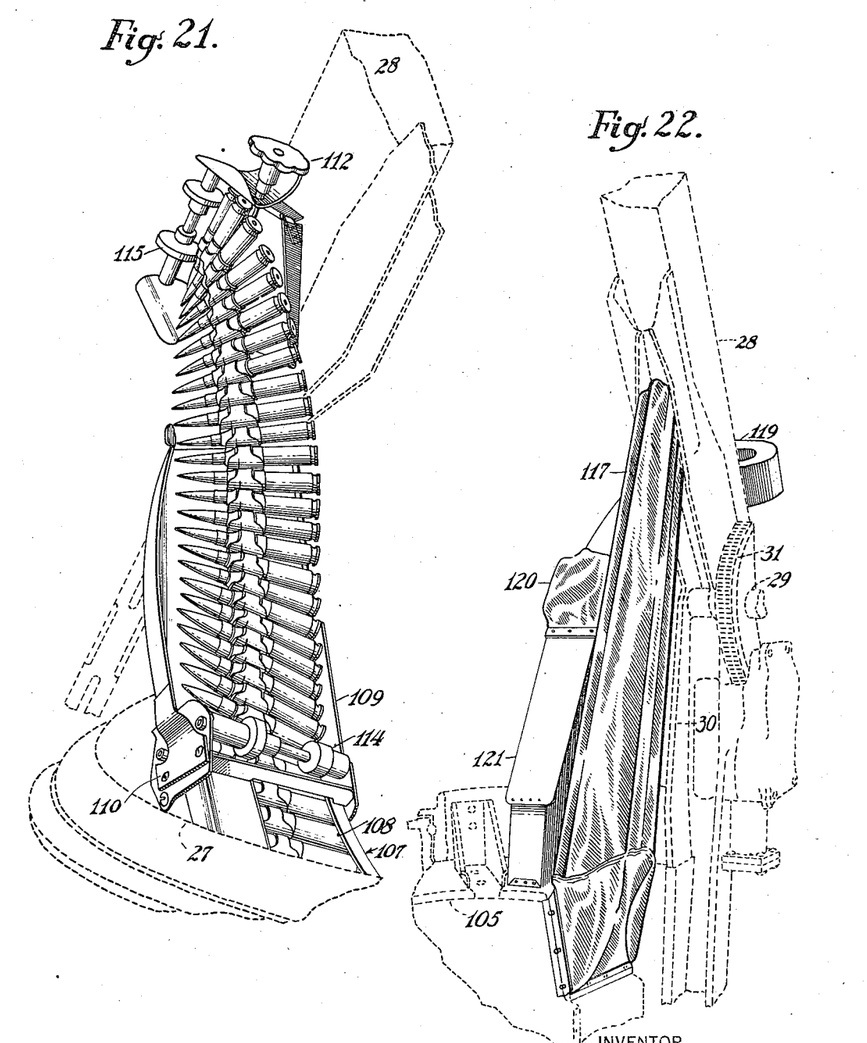
Fig. 21 is a perspective view of the ammunition feed ramp.
Fig. 22 is a perspective view of the chutes for ammunition components.

The carriage ring 27 carries a seat support structure 48 which in turn slidably supports a gunner's seat 49 through rollers 50. The weight of the seat assembly is counterbalanced, at least in part, by an elastic cord 51 and positive up-and-down movement of the seat is effected by a piston cylinder fluid motor 52 associated with the seat carrying structure 48. Said motor 52 is hydraulically connected with a piston-cylinder pump 53 whose cylinder is pivoted at 54 (Figs. 4 and 5) to the carriage 27 and whose piston is clevised at its upper end at 55 to a lever 56 secured to and rotatable with the gun trunnion 29. When the gun is elevated on its trunnion, the pump 53 is extended, and by the fluid connections between the pump 53 and the motor 52, the motor 52 is compressed, lowering the seat. In the same manner, depression of the gun raises the seat. As shown in Fig. 18, the top of the pump 53 is connected by a conduit 57 to the top of the motor 52, and the bottom of the pump 53 is connected by a conduit 58 to the bottom of the motor 52.

A sighting telescope 59 is pivoted on a bracket 59a secured to the carriage ring 27. The telescope is constrained to elevational movement with the gun through a chain 59b engaging sprockets on the telescope axle and on the gun trunnion 29. The telescope eyepiece is located at a point which is comfortable for the gunner and it is apparent that the eyepiece moves down as the gun is elevated and up as the gun is depressed. The vertical movement of the seat 49 is coordinated with telescope eyepiece movement so that the eyepiece and seat remain substantially the same distance apart regardless of the angle of elevation of the gun. The angular relationship between the line of sight and the line of fire may be adjusted by turnbuckles in the two runs of the chain 59b.

Hydraulic system

Figures 11, 12, 13, 14:
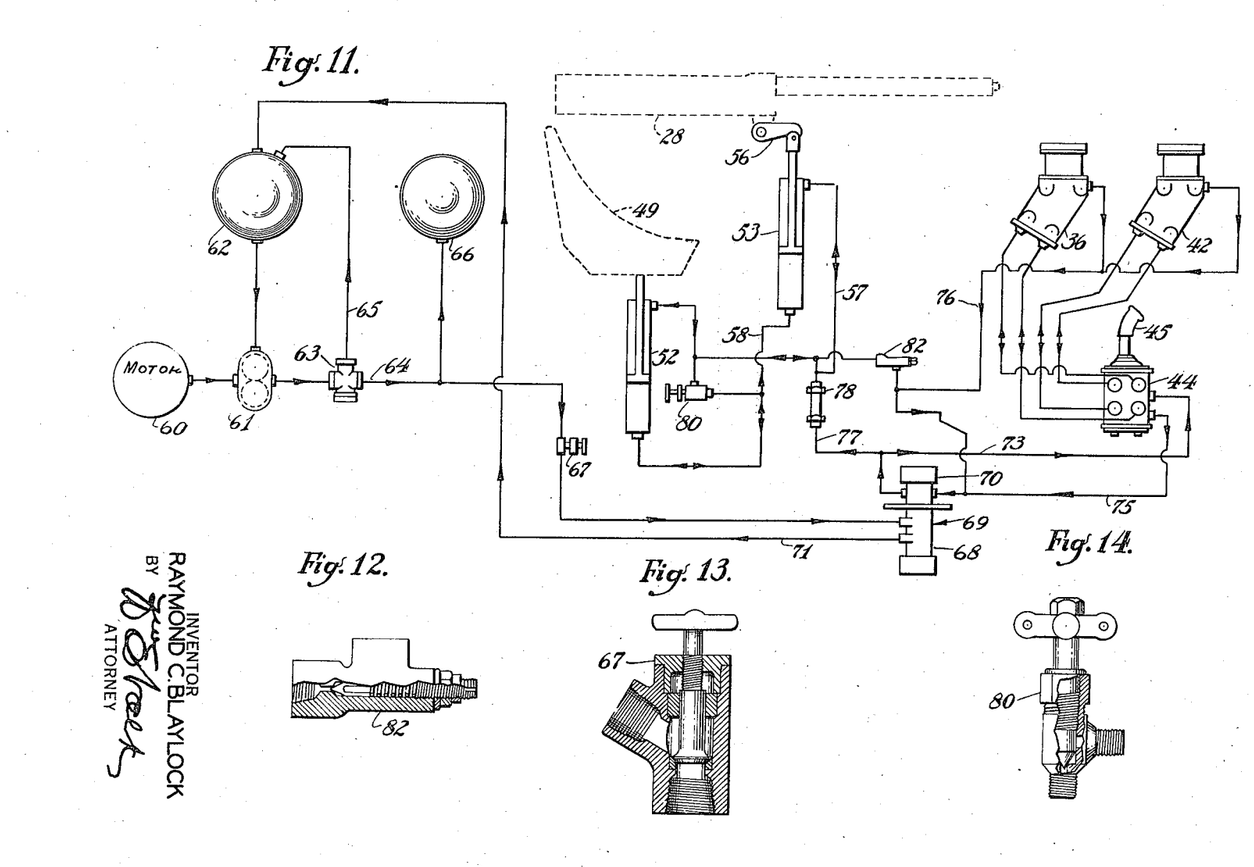
Fig. 11 is a diagram of the hydraulic system for the gun mount.
Figs. 12, 13, 14, and 15 are enlarged elevations, in section, of certain valve components of the hydraulic system.

The hydraulic system is shown in detail in Fig. 11. An electric motor 60 drives a high pressure fluid pump 61 which draws fluid from a reservoir 62 and delivers the fluid to a loaded by-pass valve 63. Fluid under the pressure established by the valve 63 is delivered to a pipe 64 while by-passed fluid is led from the valve through a line 65 to the reservoir 62. An air bell 66 is placed in the line 64 to maintain uniform pressure in the system and to minimize fluid hammer when any of the valves in the gun mount system are closed suddenly. The line 64 leads through a main shut-off valve 67 shown also in Fig. 13, to the lower casing 68 of a fluid transfer unit 69 located in the floor of the gun mount and concentric with the carriage ring 27. The carriage rotates with respect to the casing 68 and carries an upper casing 70, rotatable with the carriage, to which pressure fluid is led through the transfer unit and from which scavenge fluid may pass to the casing 68 and through a return line 71 to the reservoir 62. Pressure fluid is led from the casing 70 to a pipe 73 to the elevating and traversing control valve 44 whence, by appropriate manipulation of the control handle 45, pressure fluid is led to either motor 36 or 42, or both of them, for forward or reverse operation of either. Scavenge fluid from these is led through the valve unit 44 through appropriate ports to a pipe 75 connected with the casing 70 and thence with the return line 71. Leakage from motors 36 and 42 is carried from them through a pipe 76 leading to the scavenge line 75.

Figure 15:
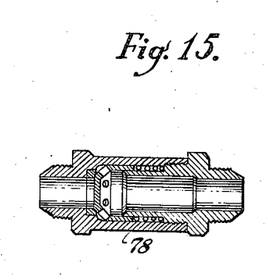

Pressure fluid is led from the casing 70 through a pipe 77 and a spring loaded check valve 78 shown also in Fig. 15 from which pressure fluid is led to the line 57 for the purpose of filling the pump 53 and the seat motor 52 with fluid at pump pressure. Once the system is filled, and provided there is no leakage, no further fluid will flow through the check valve 78, and the seat motor and pump comprise a substantially separate hydraulic system. The proper relation between the seat motor 52 and the pump 53 is established by a short circuiting valve 80 shown also in Fig. 14. When opened, the seat may be raised or lowered to its limiting positions in accordance with the raised or lowered position of the pump 53. Thereupon, the valve 80 is closed after which movements of the gun in elevation will effect corresponding movements of the seat.

A spring loaded relief valve 82, shown also in Fig. 12, is placed between the seat motor and pump system and the scavenge line 75 which allows exit bleed from the seat motor and pump system to the main supply system due to temperature changes or due to differential displacement between the seat pump 53 and the seat motor 52 as may occur due to the differential volume between the top and bottom of the pump 53 and the motor 52 as the pistons of said pump and motor move up and down. Replacement of fluid which bleeds through the valve 82 when the seat pump and motor system is adjusted to a different position, is effected through the check valve 78.

For effective operation of the system, approximately one thousand pounds per square inch hydraulic pressure passes the pressure control valve 63 which pressure is sufficient so long as the plumbing in the system is of adequate capacity to afford movements of the gun in traverse and elevation at a high rate of speed, and under conditions where the gun mount as a whole is inverted or in any other peculiar attitude occasioned by the attitude of the aircraft in which the gun mount is installed. Accurate control of speed of movement and of gun position is afforded by the valve 44 whose effective openings for passage of fluid for traverse or elevation of the gun are accurately controllable by means of the valve handle 45.

*Limit stop for gun depression*

Figure 1:
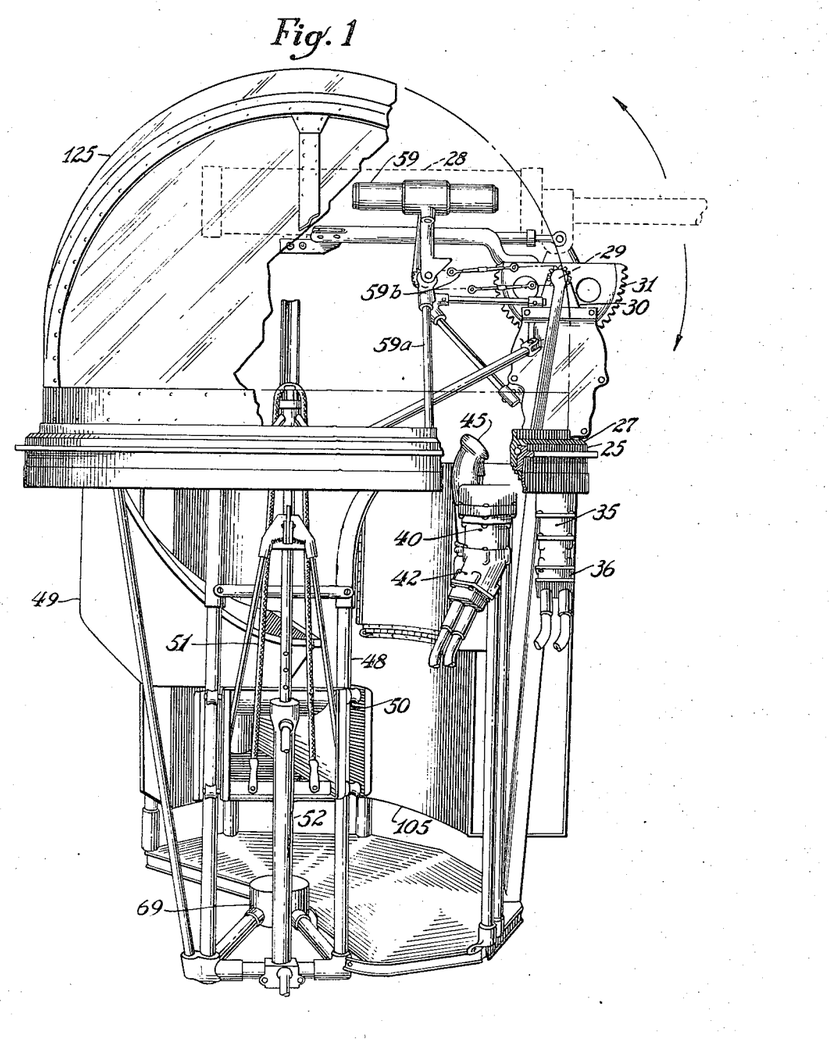
Fig. 1 is a side elevation of the gun mount.
Figure 2:
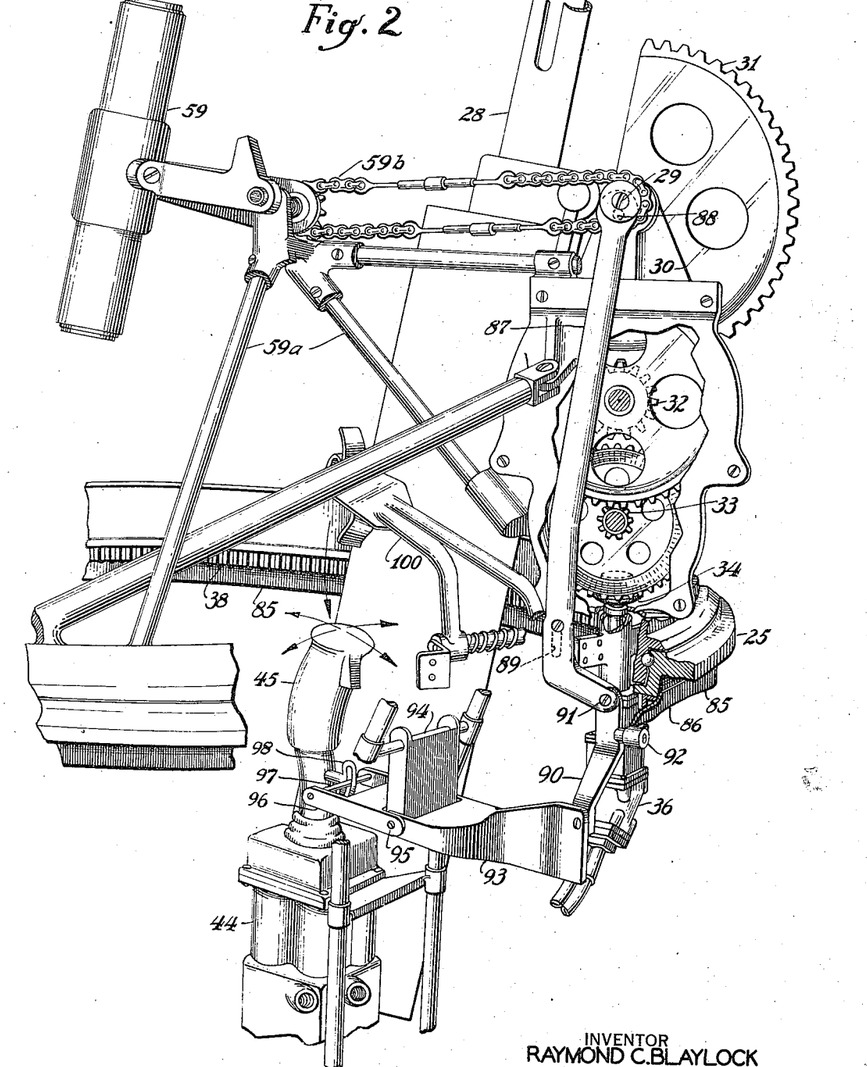
Fig. 2 is a perspective view, partly broken away, of portions of the gun mount including the elevation and traverse control mechanism.

The support ring 25, as shown in Fig. 2, carries a skirt 85 which as shown at 86 may be profiled to an irregular cam-like edge, such irregular profile being established by protuberances in the vicinity of the gun mount which, in the case of aircraft, might comprise the empennage, the cabins, the wings, etc. A rod 87 is eccentrically pivoted to the gun trunnion 29 as at 88, the lower end of said rod having a vertically sliding connection 89 with an appropriate fitting, not shown, on the carriage ring 27. Thus, the rod 87 moves up and down as the gun is depressed and elevated respectively. A link 90 is pivoted at 91 to the lower end of the arm 87 and this link carries an offset stem on which is mounted a roller 92 which at times may bear upon the cam track 86. The bottom of the link 90 is pivoted to a link 93 supported at its inner end by a swinging link 94, the inner end of the link 93 also being pivoted at 95 to a fitting 96 having a cross pin 97 passing through an arcuately slotted projection 98 secured to the valve handle 45. This mechanism provides a limit stop for minimum gun elevation and prevents the gun from being aimed at an integral part of the aircraft or vehicle structure. Its operation is as follows:

Assume that the handle 45 has been positioned forwardly (toward the gun ring) to secure gun depression at maximum speed or at any speed less than maximum. As the gun depresses, the arm 87 rises, raising the link 90 until the roller 92 engages the cam track 86. Further depression of the gun causes the bottom of the link 90 to move inwardly since the cam track acts as a fulcrum upon the roller 92. Inward movement of the bottom of the link 90 imparts inward movement to the links 93 and 96 and forcibly moves the handle 45 rearwardly, (away from the gun ring) to neutralize the valve 44 and to prevent further operation of the elevating motor 36 for gun depression. The gunner may hold the handle 45 forwardly as far as it will go and the cam track 86 will automatically allow gun depression as the gun may be moved in traverse, should the gunner move the valve handle 45 to right or left as he holds it forwardly against the stop. This device does not prohibit elevation of the gun at any time.

Gun mounts of the character disclosed are usually provided with gun fire interrupters which prevent actual firing of the gun at such times as it may be pointed at some portion of the aircraft. This limit stop mechanism prevents lost motion on the part of the gunner by limiting gun movement, while the gun fire interrupter will be primarily adapted to stop the gun fire at such times as the gun may be pointed at small and thin protuberances such as the rudder, elevator and other small parts which may lie within the field of fire of the weapon.

Figure 3:
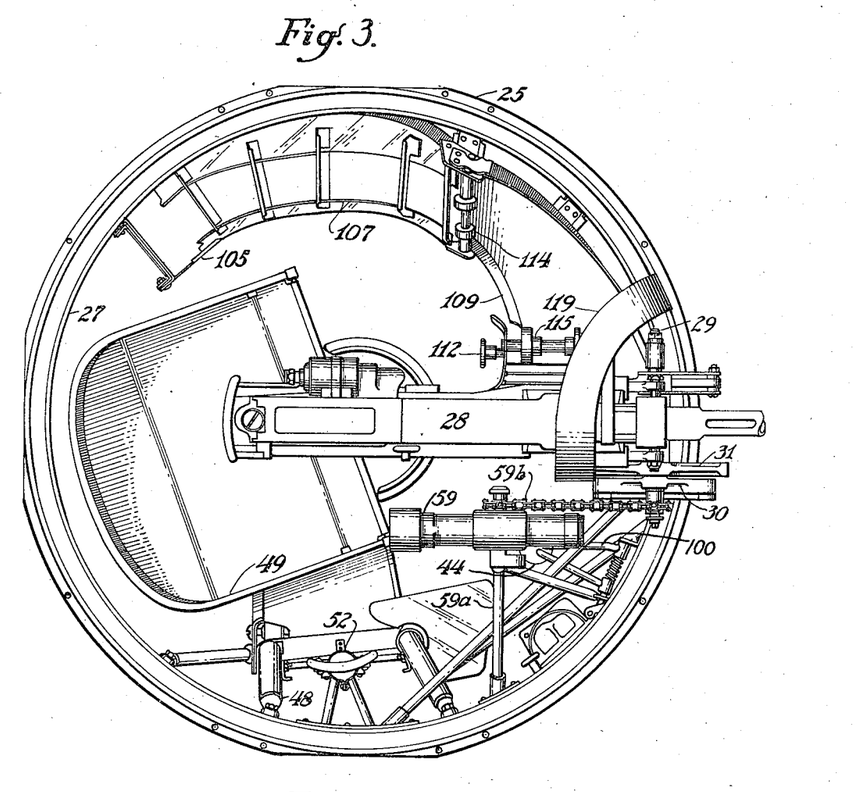
Fig. 3 is a plan of the gun mount.

As shown in Fig. 2 and Fig. 3, a safety clip 100 is shown as being pivoted to the carriage ring 27 which clip may be snapped over the end of the handle 45 to prevent inadvertent manipulation thereof when the gun is not in use.

*Ammunition supply*

Figs. 1, 6, 10, 21 and 22 show the ammunition supply system for the gun. Belted ammunition is housed within a compartment 104 in a segmental ammunition container 105 attached to the carriage ring 27. The belt feeds from the compartment 104 through a top port 106 to a lower ramp 107 which confines the belt to a definite path of travel by means of flanges 108. An upper ramp 109 is secured to the lower ramp at 110 and comprises an open tray along which the belted ammunition may pass to the gun breech. The ramp 109 may swing slightly and is so formed that as the gun is elevated and depressed, no stoppage of ammunition feed to the gun may occur. The gun breech carries a manually operated feed wheel 112 operating on star wheels by which the ammunition belt may be fed into the gun after it has been threaded through the guides 108 and 109 to the star wheels. Flapping of the ammunition belt is minimized by the provision of guide rollers 114 and 115 on the guide 109 and on the star wheel assembly respectively.

The container 105 includes a compartment 116 into which cartridge cases and separable belt clips may be discharged from the gun. To control such discharge, a fabric or leather chute 117 is secured to the case discharge opening in the bottom of the gun 28, which chute opens into the compartment 116. Disposal of belt clips is taken care of through a form fitting chute 119 secured to the gun which leads over the top of the gun to a leather or fabric chute 120 substantially alined with the gun trunnion 29 and thence to a rigid link chute 121 opening to the compartment 116. The form fitting chute 119 holds the belt links in interlocking relation despite the fact that ammunition rounds have been withdrawn from the belt, so that these links do not tangle with one another and so that they may be discharged without danger of jamming into the larger link chute 121. Since the chute 119 must define a somewhat circuitous path of travel for the links, its bulk is materially reduced by making it of form fitting shape.

Figure 8:
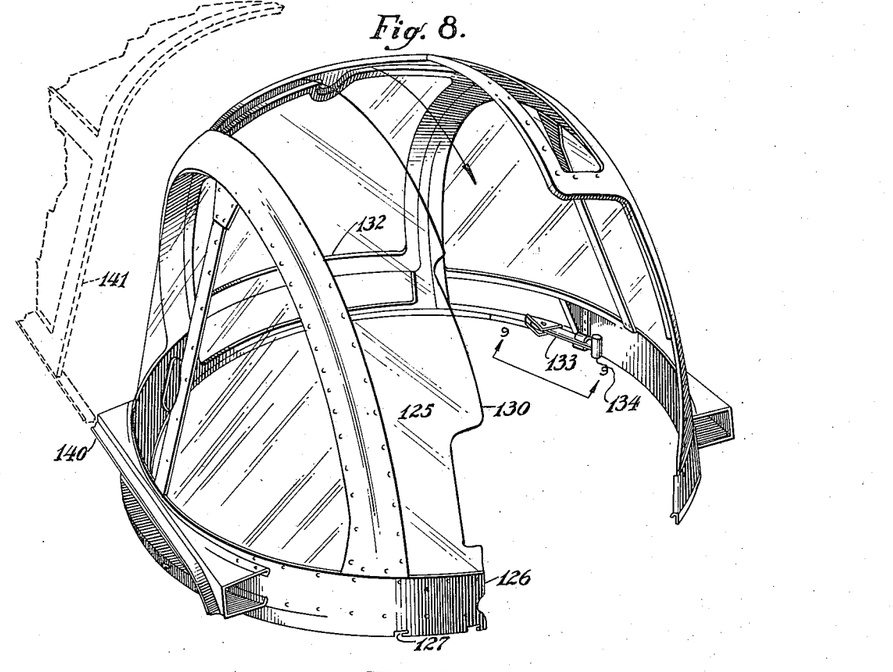
Fig. 8 is a perspective view of the gun mount closure.
Figure 9:
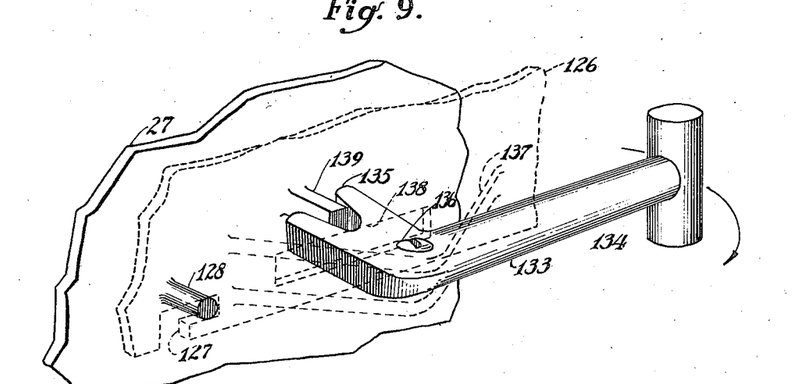
Fig. 9 is a perspective view on the line 9—9 of Fig. 8.
Figure 10:
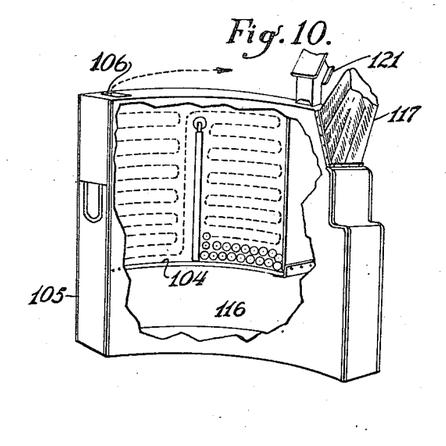
Fig. 10 is a perspective view, partly broken away, of the ammunition container.

Protection is afforded for the gunner by a substantially hemispherical canopy or closure 125 (Figs. 8 and 9) attached to the carriage ring 27 whereby said closure is turnable with the carriage. A metallic rim 126 forming the bottom border for the closure, is provided with a plurality of bayonet slots 127 engageable with inwardly projecting pins 128 on the carriage ring 27, as shown in Fig. 9. Suitable ports 130 are formed in the closure 125 to allow of elevating movement of the gun and the closure is provided with a sliding window 132 which may be drawn over portions of such port when the gun is out of action and when maximum protection is needed for the gunner. Quick release of the closure 125 is made possible by a lever 133 having a handle 134 and a fork 135, said lever being pivoted at 136 to a bracket 137 secured to the rim 126. The forked end 135 of the lever passes through a slot 138 in the rim 126 and engages a boss 139 rigid with the carriage ring 27. The elements are shown in locked position for the closure 125. When the handle 134 is pulled outwardly in the direction of the arrow (Fig. 9), the rim 126 is moved rotationally with respect to the carriage ring 27 to aline the pins 128 with the openings of the bayonet slots 127 whereby the closure 125 may be lifted vertically from the carriage ring. Auxiliary tracks 140 may be provided on the sides of the closure 125 over which a slidable cockpit closure 141 on the aircraft may be slid.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a power operated gun mount for aircraft, a track, a gun carrying carriage movable therealong for gun traverse, said gun being pivoted on the carriage for elevational adjustment, a hydraulic pressure source, a hydraulic motor operable to move the carriage along the track, a hydraulic motor operable to move the gun in elevation, a unitary valve structure connecting said source with both said motors, a single valve control handle operable back and forth between certain limits to control carriage traverse, and operable back and forth between other limits to control gun elevation, and means for automatically restoring said control handle to a neutral position with respect to its movement between said last mentioned limits when said gun approaches the lower effective limit of its range of elevational adjustment.

2. In a power operated gun mount, a curved track, a carriage movable therealong, a gun trunnioned on the carriage for movement in elevation, a reversible motor for moving the carriage, a reversible motor for elevating and depressing the gun, a single movable control handle for both said motors, a control member connected with a power source and with both said motors and on which said handle is mounted, said handle and member being arranged so that fore and aft handle movements control elevation and depression of the gun and transverse handle movements control movement of the carriage along said track, and means for automatically restoring said control handle to a neutral position with respect to fore and aft movements when said gun approaches the lower effective limit of its range of elevational movement.

RAYMOND C. BLAYLOCK.